E. K. CRAIG.
REVERSING GEAR.
APPLICATION FILED OCT. 25, 1915.

1,177,490.

Patented Mar. 28, 1916.

Witnesses
F. Windridge
R. M. Smith

Inventor
E. K. Craig
By Victor J. Evans
Attorney

THE COLUMBIA PLANOGRAPH CO., WASHINGTON, D. C.

UNITED STATES PATENT OFFICE.

ERIC K. CRAIG, OF SKIDOO, CALIFORNIA.

REVERSING-GEAR.

1,177,490.   Specification of Letters Patent.   Patented Mar. 28, 1916.

Application filed October 25, 1915. Serial No. 57,833.

*To all whom it may concern:*

Be it known that I, ERIC K. CRAIG, a citizen of the United States, residing at Skidoo, in the county of Inyo and State of California, have invented new and useful Improvements in Reversing-Gear, of which the following is a specification.

This invention relates to reversing gear for internal combustion engines and particularly engines of the class referred to as now incorporated in power boats of all kinds, the object of the invention being to produce simple, compact, strong and positively acting reversing gearing whereby, with the aid of a single manually controlled lever and a male clutch member operated thereby, the driven shaft may be revolved in either one direction or the other while the driving shaft is rotating constantly in the same direction, the reversing of the driven shaft being accomplished without throwing any toothed gears into or out of mesh and thereby avoiding clashing of the gears and all danger of stripping the teeth thereof.

With the above and other objects in view, the invention consists in the novel construction, combination and arrangement of parts, as herein described, illustrated and claimed.

Figure 1:
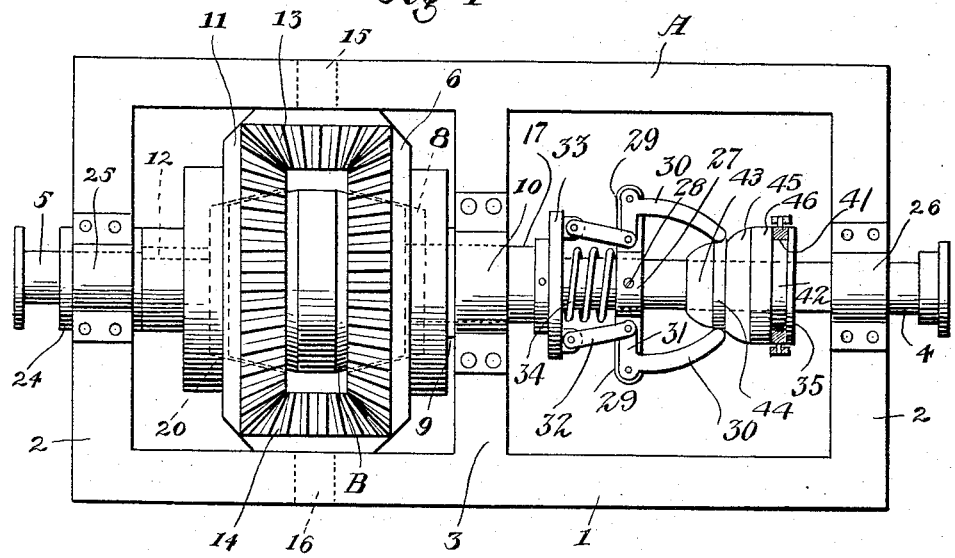
Figure 2:
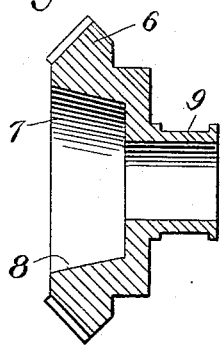
Figure 3:
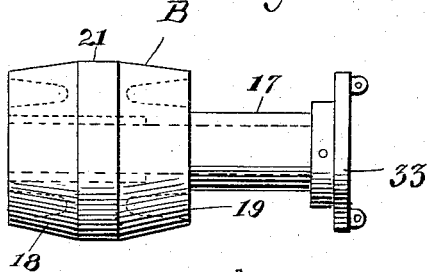
Figure 4:
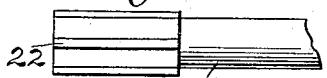
Figure 5:
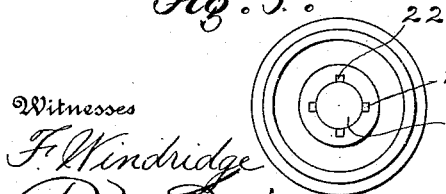
Figure 6:
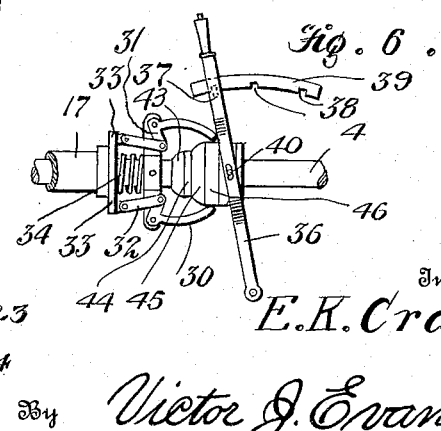

In the accompanying drawings:—Figure 1 is a plan view of the reversing gear of this invention. Fig. 2 is a diametrical section through one of the large gears. Fig. 3 is a plan view of the sliding clutch sleeve and male clutch member. Fig. 4 is a similar view of one end of the driving shaft. Fig. 5 is an end view of the driving shaft and male clutch member combined. Fig. 6 is a fragmentary side elevation showing the relation of the reversing lever to the sliding sleeve and driving shaft.

In constructing the reversing gear of this invention I provide a stout substantially rectangular supporting frame designated generally at A and comprising the side bars 1, end bars 2 and an intermediate cross bar 3.

4 designates the driving shaft which is usually the engine shaft or an extension thereof, 5 designating the driven shaft which in a boat or vessel is usually the propeller shaft or an extension thereof. Both of these shafts 4 and 5 are rotary but are longitudinally immovable.

The shaft 4 has mounted loosely thereon a bevel gear 6 which is cored out or recessed as shown at 7 to leave an internal conical clutch face 8, the gear 6 thus forming a female clutch member having an extended sleeve-like hub 9 which revolves in a bearing 10 fastened to the intermediate cross bar 3 of the frame A. The propeller shaft 5 has fast thereon another bevel gear 11, the counterpart of the gear 6 above described and disposed in reverse relation to the gear 6 as clearly shown in Fig. 1. The gear 11 is shown as fastened to the driven shaft 5 by means of a key 12. Other bevel gears 13 and 14 preferably smaller than the gears 6 and 11 for the sake of compactness are journaled upon stud shafts 15 and 16 having a fixed relation to the frame A.

Mounted on the driving shaft 4 is a clutch sleeve 17 which is slidable longitudinally of said driving shaft and which carries a double cone-shaped male clutch member designated generally at B and comprising the oppositely tapering conical faces 18 and 19 adapted to respectively engage the clutch face 20 of the gear 11 and the clutch face 8 of the gear 6 according to the direction in which the sleeve 17 and the male clutch member B are shifted. Intermediate the clutch faces 18 and 19, the clutch member B is shown as provided with an intermediate cylindrical face 21. The driving shaft 4 is provided at its extremity with fixed keys or ribs 22 which are received in key ways or grooves 23 in the inner face of the clutch sleeve 17 as shown in Fig. 5. This enables the sleeve 17 and the clutch member B to be slid longitudinally of the driving shaft 4 while causing said parts to always revolve together.

24 represents a combined bearing and thrust collar for the driven shaft 5 when used as the propeller shaft of a boat or vessel, the bearing 24 being in turn held in place by another bearing 25 on the frame A. At the opposite end of the frame A is another bearing 26 for the driving shaft 4.

27 designates a collar fastened to the shaft 4 by means of a set screw 28 enabling said collar to be adjusted to the desired point along said shaft. The collar 27 is provided with radially extending arms 29 to the outer ends of which are pivotally connected clutch dogs 30 having inwardly extending portions 31 which are connected by pivotal links 32 to a head piece or flange 33 fast on the sleeve 17 above described. A stout coiled expansion spring 34 is interposed between the collar 27 and the head piece or flange 33 and serves to press the clutch into engagement with the internal clutch face 20 for straight ahead drive. Slidable along the driving shaft 4 is a spreader 35 which is shiftable by means of a hand lever 36 carrying a latch 37 adapted to engage any one of a plurality of notches 38 in a rack 39. The lever 36 has a pin and slot connection at 40 with a ring 41 fitting loosely in an annular groove 42 in the spreader 35.

The spreader is formed with a relatively small conical face 43 followed by a cylindrical dwell face 44 in turn followed by a relatively large cone face 45 and terminating in a larger dwell face 46. In the operation of the mechanism just described, when the spreader 35 is in the position shown in Fig. 1, the clutch member B is in a neutral or inoperative position. By moving the spreader 35 to the right in Fig. 1, the clutch dogs 30 move downwardly along the conical face 43 thereby permitting the spring 34 to thrust the clutch face 18 into engagement with the clutch face 20 for driving ahead. By moving the spreader 35 in the opposite direction or to the left, the clutch dogs 30 ride upwardly on the cone face 45 until they rest upon the larger cylindrical face 46 as shown in Fig. 6. This results in compressing the spring 34 and shifting the other clutch face of the clutch B into engagement with the clutch face 8 thereby driving the shaft 5 in the opposite direction for the purpose of backing the boat, vessel, or other vehicle in connection with which the reversing gear is used.

From the foregoing description, taken in connection with the accompanying drawings, it will now be understood that when the reversing lever 36 is moved in one direction, the clutch member B which is constantly driven by the driving shaft 4 will engage the internal clutch face 20 of the gear 11, causing the driving shaft and the driven shaft to rotate at the same speed. When the mechanism is used in a boat or vessel, this direction of rotation drives the boat ahead. In order to reverse the direction of rotation of the driven shaft 5, the reverse lever 36 is moved in the opposite direction thereby causing the clutch member B to engage the clutch face 8 of the gear 6. The drive is then from the shaft 4 through the gear 6, gears 13 and 14 and gear 11 to the driven shaft. When the two shafts are in direct drive, the gear 6 revolves loosely around the sleeve 17. In either direction of rotation, both the driving shaft and the driven shaft turn at the same speed. The gears always remain in mesh thus eliminating any clashing or stripping of the same when changing the direction of rotation of the driven shaft. The sliding clutch sleeve is mounted on the engine shaft and is slidable thereon and, furthermore, is short so as to render the gearing as compact as possible. Furthermore, there are but four friction faces, two on the member B and one in the gear 6 and one in the gear 11. Furthermore, there is no pressure on the head piece 33 thus eliminating all but rotary friction except when the clutch is being actually shifted in one direction or the other.

Having thus described my invention, I claim:—

1. In reversing gear, the combination of a supporting frame, a driving shaft, a driven shaft in line with said driving shaft, a bevel gear fast on the driven shaft and cored out to provide a female clutch face, a bevel gear normally loose in relation to and surrounding the driving shaft, the last named gear being cored out to provide a female clutch face, other bevel gears interposed between the aforesaid gears and journaled on shafts having a fixed relation to the supporting frame, a clutch sleeve surrounding and slidable lengthwise of the driving shaft and through the adjacent gear having the female clutch face, means for shifting said sleeve, and a double faced conical male clutch member carried by said clutch sleeve and shiftable into engagement with either one of said female clutch faces, said sleeve being feathered to the driving shaft.

2. In reversing gear, the combination of a supporting frame, a driving shaft, a driven shaft in line therewith, a clutch sleeve feathered to and slidable longitudinally of said driving shaft, a double conical male clutch member carried by said clutch sleeve and bearing a fixed relation thereto, a bevel gear fast on the driven shaft, another bevel gear loosely journaled on said clutch sleeve, both of said gears being provided with female clutch faces to be engaged one at a time by the corresponding clutch faces of the male clutch member, and means for shifting said clutch sleeve.

3. In reversing gear, the combination of a supporting frame, a driving shaft, a driven shaft in line therewith, a clutch sleeve feathered to and slidable longitudinally of said driving shaft, a double conical male clutch member carried by said clutch sleeve and bearing a fixed relation thereto, a bevel gear fast on the driven shaft, another bevel gear loosely journaled on said clutch sleeve, both of said gears being provided with female clutch faces to be engaged one at a time by the corresponding clutch faces of the male clutch member, means for shifting said clutch sleeve, the clutch sleeve shifting means comprising a manually controlled lever, a spreader surrounding the driving shaft and shiftable longitudinally thereof by means of said lever, a collar fast on said driving shaft, clutch dogs pivotally carried by the last named collar and adapted to be forced apart by said spreader, links connecting said dogs with the clutch sleeve, and an expansion spring interposed between the last named collar and said clutch sleeve.

In testimony whereof I affix my signature in presence of two witnesses.

ERIC K. CRAIG.

Witnesses:
P. A. BLUNK,
R. W. LANDRUM.

Copies of this patent may be obtained for five cents each, by addressing the "Commissioner of Patents, Washington, D. C."